April 6, 1937.　　　　J. WILEY　　　　2,076,488
GROUND AND CHOPPED FOOD MOLDING MACHINE
Filed Oct. 23, 1935　　　3 Sheets-Sheet 1
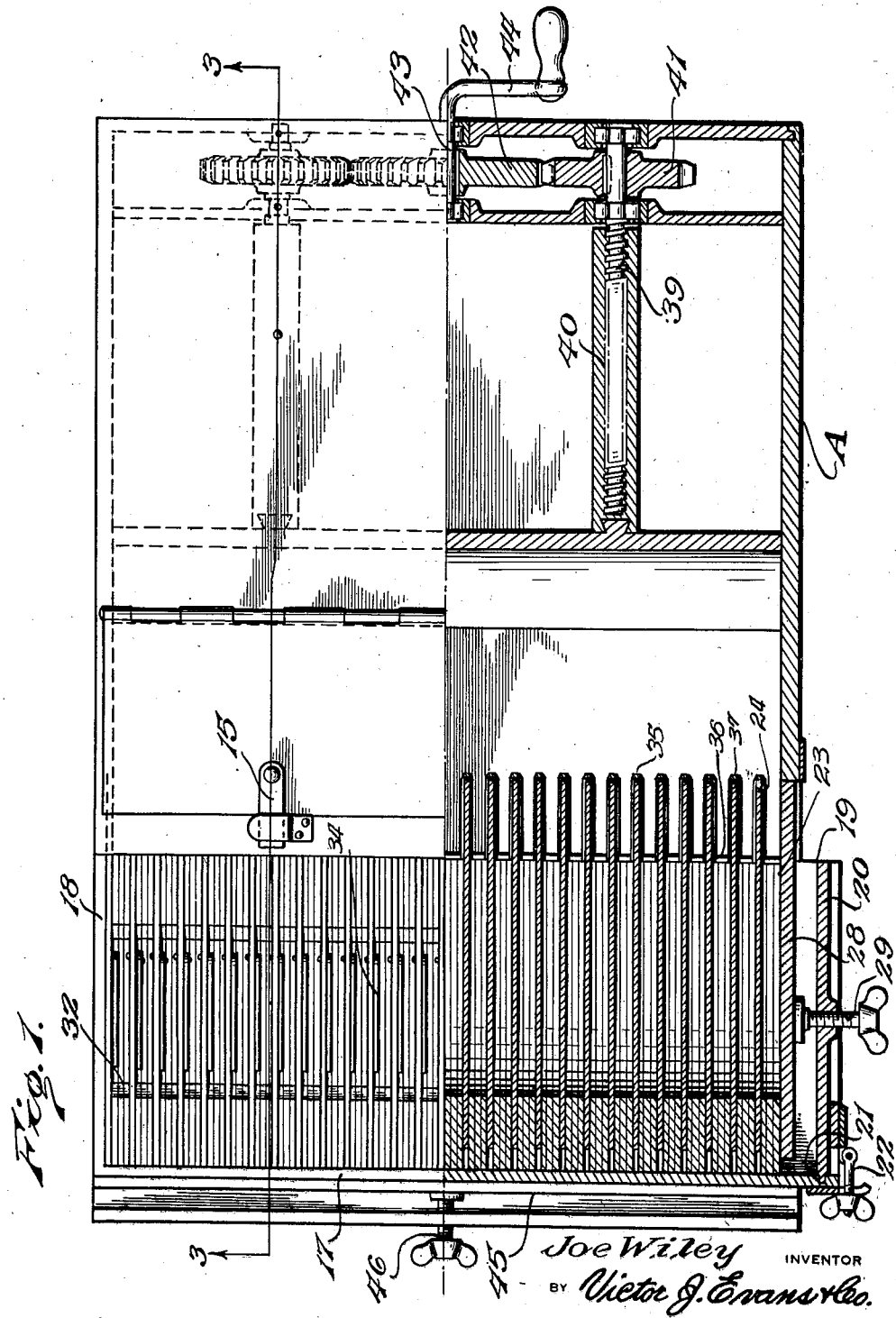

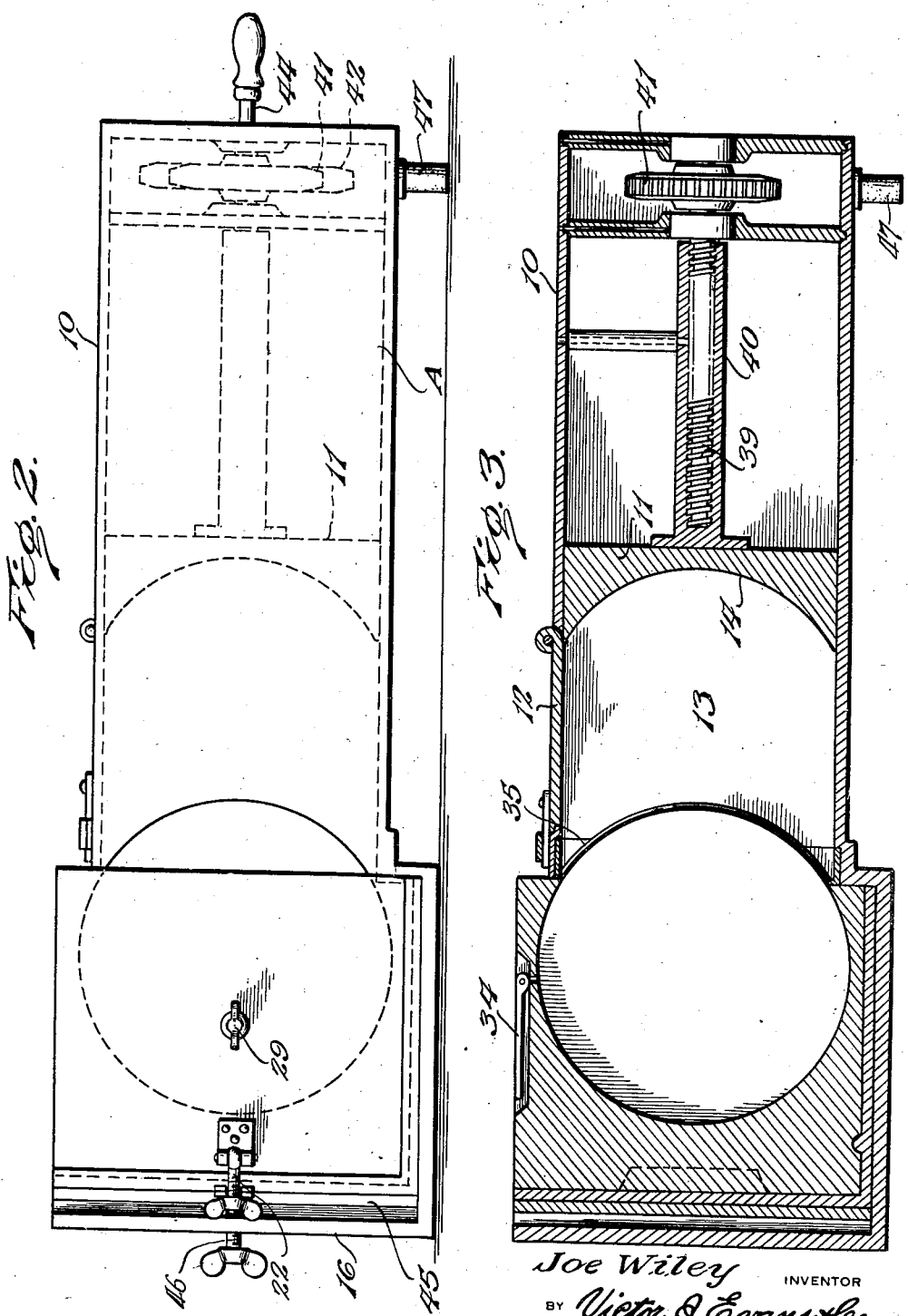

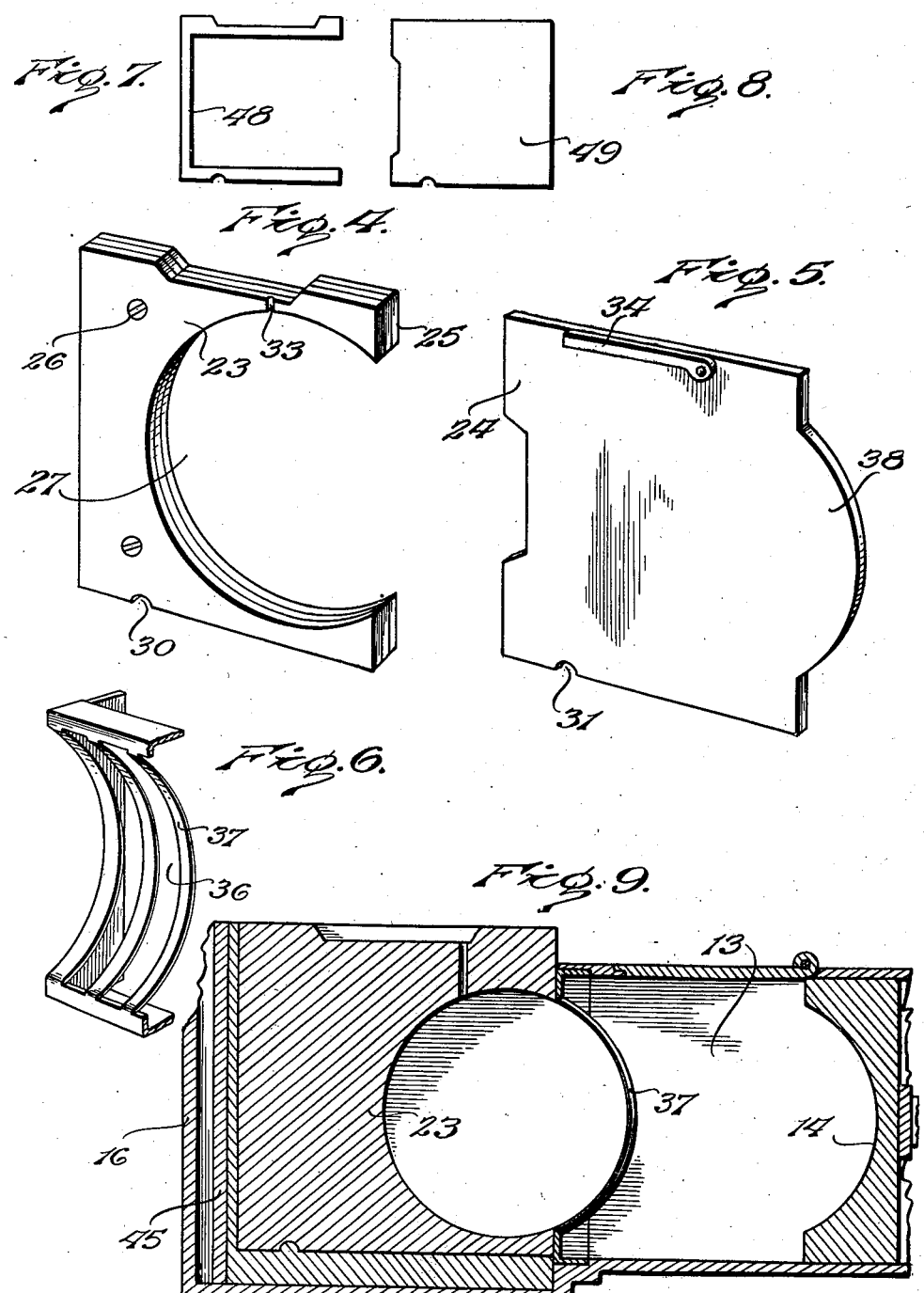

Patented Apr. 6, 1937

2,076,488

UNITED STATES PATENT OFFICE 2,076,488

GROUND AND CHOPPED FOOD MOLDING MACHINE

Joe Wiley, Fresno, Calif., assignor of one-third to John D. Morgan and Charles A. James, both of Fresno City, Calif.

Application October 23, 1935, Serial No. 46,453

4 Claims. (Cl. 17—32)

The invention relates to a hamburger steak molding machine and more particularly to a chopped meat or food molding machine.

The primary object of the invention is the provision of a machine of this character, wherein hamburger steak can be conveniently and easily molded into slabs or what might be termed sandwich pads, each of the required thickness and shape for the making of a sandwich, and in which the molds are readily and easily withdrawn for the cleaning thereof and also other parts of the machine can be separated to assure sanitary conditions thereto in the use of the same.

Another object of the invention is the provision of a machine of this character, wherein the construction of the same is novel in form and will assure the molding of hamburger steak or chopped food products so as to create slabs or slices, the making of the slices or slabs being effected with dispatch and the same being of uniform thickness, thus hand molding being entirely eliminated.

A further object of the invention is the provision of a machine of this character which is comparatively simple in its construction, readily and easily handled, thoroughly reliable and efficient in its operation, assuring the molding of hamburger steak with dispatch; and strong, durable and comparatively inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of the machine partly in section constructed in accordance with the invention.

Figure 2 is an end elevation.

Figure 3 is a sectional view on the line 3—3 of Figure 1 looking in the direction of the arrows.

Figure 4 is a perspective view of one of the mold elements.

Figure 5 is a perspective view of a partition or separator.

Figure 6 is a fragmentary perspective view of a cutter grating.

Figure 7 is a side elevation of a modified form of mold.

Figure 8 is a side elevation of a partition or separator for the modified form shown in Figure 7.

Figure 9 is a fragmentary sectional view similar to Figure 3 taken through one of the mold parts.

Similar reference characters indicate corresponding parts throughout the several views in the drawings.

Referring to the drawings in detail, particularly Figures 1 to 6, inclusive, A designates generally the body of the machine formed with a housing 10 in which is slidably fitted a presser head 11 and at the top of this housing is arranged a vertically swinging gate or door 12 which, when opened, gives access to a feeding space or chamber 13 confronted by said head 11, which has the concaved working side 14. Into the space or chamber 13 is adapted to be introduced the hamburger steak or other chopped food product to be molded. The gate or door 12 when closed is made secure by a latch 15.

Joined with the housing 10 is a bottom and back walled frame or rack 16 which is open at opposite ends and at its top to accommodate a removable mold carrying magazine 17 having the permanent end 18 and open end 19, respectively, the latter end accommodating a separable end piece 20 seated in a groove or channel 21 and held separably fixed by a fastener 22. Into this magazine are introduced the mold parts 23 and separators 24, respectively. Each mold part is formed with a plurality of plate-like sections 25 detachably fastened together by fasteners 26, and in this manner the thickness of the mold part 23 can be changed or varied accordingly to the requirements of the slab of hamburger steak or other chopped food products as molded therein in the molding cavity or space 27 provided in said mold part. The mold parts 23 and separators are alternately arranged side by side within the magazine 17 and are held assembled in close contacting relation to each other by a follower 28 acted upon by an adjusting screw 29 threaded in the end piece 20. The bottom edges of the mold parts 23 and separators 24 are provided with notches 30 and 31, respectively, which register with each other for accommodating a key rib 32 formed on the bottom of the magazine 17 so as to maintain the said mold parts and separators in alignment with each other.

The mold parts 23 are provided with air escape vents 33 leading from the cavities 27 to without the machine. The separators carry foldable or swinging hand holds 34 so they can be conveniently removed from between the mold parts 23 when required.

Carried by the housing 10 between the feed space or chamber 13 and the cavities 27 of the mold part 23 is a cutter grating 35, it being outwardly curved and providing the alternate slots and webs 36 and 37, respectively, the said webs being in overlapping relation to the rounded extensions 38 of the separators 34 while the slots 36 align with the cavities 27 in the mold part 23 and through these slots passes the hamburger meat advanced under the influence of the head 14 so that slabs or slices of hamburger will be molded between the separators 24 in the mold part 23 under pressure exerted by the head 14. This head 14 is advanced and retracted by feed screws 39 operating in cylindrical barrels 40 detachably joined with the head 14. The said screws 39 are fitted with pinions 41 meshing with a drive gear 42 which has connected with its axle 43 suitably journaled in the housing 10 a hand crank 44. The said screws 39 under operating the hand crank 44 will be simultaneously actuated to advance or retract the head 14 in the operation of the machine.

The mold parts 23 and separators 24 are disposed in their alternate relation to each other in a perpendicular position side by side in the magazine 17 and are held tightly together by the follower 28 so that hamburger meat can not escape from the cavities 27 during the molding operation of the machine and such hamburger meat will be molded into slabs or slices for the making of sandwiches having a hamburger meat fill.

The magazine 17 is held fixed in the rack 16 by a clamping plate 45 acted upon by a set screw 46 mounted in the back wall of said rack 16.

The housing 10 has fitted therewith feet 47 so that the machine can be placed upon a table or other support and sustained substantially level.

In Figure 7 of the drawings there is shown a slight modification of mold part, which is indicated at 48, while in Figure 8 of the drawings is shown a companion separator 49.

The quantity of meat which has been previously ground and placed within the feed space or chamber 13 when pressed into the cavities 27 will be cut into slabs or slices by the cutter grating having the slots 36 and webs 37. This grating is removably fitted within the housing 10 in confronting relation to the mold parts 23 and separators 24 next to the magazine 17 containing the latter.

The mold parts 23 and separators 24 are readily separable from the magazine 17 and the head 14 is also separable from the feed screws so that all parts of the machine can be readily cleaned for sanitary purposes. The housing and the rack of the machine are readily accessible for cleaning purposes.

What is claimed is:

1. A machine of the character described, comprising a housing having a feed chamber, a head slidable in the housing and working through said chamber, a magazine rack next to the chamber, a magazine carried by said rack, alternately arranged mold parts and separators removably fitted in the magazine with the mold parts communicating therewith, means for holding the mold parts and separators assembled within the magazine, means for advancing and retracting the head within the housing and a cutter grating associated with the mold parts and separators and removably fitted in said chamber.

2. A machine of the character described, comprising a housing having a feed chamber, a head slidable in the housing and working through said chamber, a magazine rack next to the chamber, a magazine carried by said rack, alternately arranged mold parts and separators removably fitted in the magazine with the mold parts communicating therewith, means for holding the mold parts and separators assembled within the magazine, means for advancing and retracting the head within the housing, a cutter grating associated with the mold parts and separators and removably fitted in said chamber and means for detachably clamping the magazine within the rack.

3. A machine of the character described, comprising a housing having a feed chamber, a head slidable in the housing and working through said chamber, a magazine rack next to the chamber, a magazine carried by said rack, alternately arranged mold parts and separators removably fitted in the magazine with the mold parts communicating therewith, means for holding the mold parts and separators assembled within the magazine, means for advancing and retracting the head within the housing, a cutter grating associated with the mold parts and separators and removably fitted in said chamber, means for detachably clamping the magazine within the rack and a retaining key in the magazine and engaged with the said mold parts and separators to hold the same aligned with each other.

4. A machine of the character described, comprising a housing having a feed chamber, a head slidable in the housing and working through said chamber, a magazine rack next to the chamber, a magazine carried by said rack, alternately arranged mold parts and separators removably fitted in the magazine with the mold parts communicating therewith, means for holding the mold parts and separators assembled within the magazine, means for advancing and retracting the head within the housing, a cutter grating associated with the mold parts and separators and removably fitted in said chamber, means for detachably clamping the magazine within the rack, a retaining key in the magazine and engaged with the said mold parts and separators to hold the same aligned with each other and foldable hand holds carried by said separators and accessible at the top of the magazine.

JOE WILEY.